(12) United States Patent
Yasuda (10) Patent No.: US 9,512,880 B2
(45) Date of Patent: Dec. 6, 2016

(54) ROLLING BEARING (71) Applicant: JTEKT CORPORATION, Osaka-shi, Osaka (JP)

(72) Inventor: Yuu Yasuda, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/003,123

(22) Filed: Jan. 21, 2016

(65) Prior Publication Data

US 2016/0215822 A1 Jul. 28, 2016

(30) Foreign Application Priority Data

Jan. 28, 2015 (JP) .................................. 2015-014632

(51) Int. Cl.
*F16C 33/38* (2006.01)
*F16C 19/06* (2006.01)
*F16C 33/46* (2006.01)

(52) U.S. Cl.
CPC ....... *F16C 33/3875* (2013.01); *F16C 33/4652* (2013.01); *F16C 33/3862* (2013.01); *F16C 33/3887* (2013.01); *F16C 2226/74* (2013.01); *Y10T 29/49691* (2015.01)

(58) Field of Classification Search
CPC ....... F16C 19/06; F16C 33/38; F16C 33/3862; F16C 33/3875; F16C 33/3887; F16C 33/6614; F16C 33/6651; F16C 2226/74; F16C 33/4647; F16F 33/4652; Y10T 29/49691

USPC .............. 384/470, 523, 526, 527, 528, 530, 539,384/572, 609, 614; D15/143; 29/898.67

See application file for complete search history.

(56) References Cited

U.S. PATENT DOCUMENTS

| 1,176,133 | A | * | 3/1916 | Czech ..................... F16C 33/42 |
| | | | | 384/530 |
| 1,366,312 | A | * | 1/1921 | Danielsson ......... F16C 33/3868 |
| | | | | 384/526 |
| 1,922,540 | A | * | 8/1933 | Heffernan ............. F16C 33/422 |
| | | | | 384/530 |
| 2,740,674 | A | * | 4/1956 | Zay ....................... F16C 33/427 |
| | | | | 384/530 |

(Continued)

FOREIGN PATENT DOCUMENTS

| JP | 2004076778 A | * | 3/2004 |
| JP | 2006226448 A | * | 8/2006 |
| JP | 4946881 B2 | | 6/2012 |

*Primary Examiner* — Marcus Charles
(74) *Attorney, Agent, or Firm* — Oliff PLC (57) ABSTRACT

A rolling bearing includes a resin cage. The resin cage includes a pair of split members split in two halves in an axial direction. Each of the split members has pocket portions and coupling portions alternately arranged in a circumferential direction. On a first coupling portion of the coupling portions coupled together, an engagement pawl is formed which protrudes from a coupling surface in the axial direction. On a second coupling portion, an engagement groove is formed which is recessed in the axial direction with respect to the coupling surface and into which the engagement pawl is inserted. The engagement pawl has a base portion and a pawl portion engaging with the second coupling portion. An insertion hole is formed in the first coupling portion so as to pass through the first coupling portion in the axial direction such that a mold is inserted into the insertion hole.

18 Claims, 7 Drawing Sheets

(56) References Cited

U.S. PATENT DOCUMENTS

| | | | | |
|---|---|---|---|---|
| 3,471,208 A * | 10/1969 | Vannest | ............... | F16C 33/3868 |
| | | | | 384/530 |
| 3,586,405 A * | 6/1971 | Claesson | ............. | F16C 33/3875 |
| | | | | 384/526 |
| 3,712,692 A * | 1/1973 | Restelli | ............... | F16C 33/3868 |
| | | | | 384/579 |
| D323,837 S * | 2/1992 | Johnson | ........................ | D15/143 |
| 7,507,028 B2 * | 3/2009 | Markle | ............... | F16C 33/3875 |
| | | | | 384/470 |
| 7,703,986 B2 * | 4/2010 | Naito | .................. | F16C 33/3875 |
| | | | | 384/526 |
| 8,408,808 B2 * | 4/2013 | Hosmer | .............. | F16C 33/3875 |
| | | | | 384/470 |
| 8,556,519 B2 * | 10/2013 | Bohr | .................. | F16C 33/4652 |
| | | | | 384/568 |
| 9,022,662 B2 * | 5/2015 | Ito | ............................ | F16C 19/06 |
| | | | | 384/470 |
| 2013/0272638 A1 * | 10/2013 | Mola | ................... | F16C 33/3875 |
| | | | | 384/470 |

* cited by examiner

ROLLING BEARING

INCORPORATION BY REFERENCE

The disclosure of Japanese Patent Application No. 2015-014632 filed on Jan. 28, 2015 including the specification, drawings and abstract, is incorporated herein by reference in its entirety.

BACKGROUND OF THE INVENTION

1. Field of the Invention

The present invention relates to a rolling bearing including a synthetic-resin cage.

2. Description of Related Art

As a synthetic-resin cage that holds rolling elements arranged between an inner ring and an outer ring of a rolling bearing, a so-called half-encasing cage is known. The half-encasing cage has a plurality of pockets formed at regular intervals to hold balls. Each of the pockets is shaped to be open toward one side in an axial direction so as to allow the ball to be installed in the pocket. When a rolling bearing with the half-encasing cage rotates at high speed, a resultant centrifugal force causes a portion of the cage on one side in the axial direction, that is, the side to which the pockets open, to be deformed and opened. As a result, the cage and the balls interfere with one another so that a rotary torque of the rolling bearing may increase or seizure may occur in the rolling bearing.

On the other hand, a fully-encasing synthetic-resin cage is also known which can be used even under a high-speed rotation condition (see, for example, Japanese Patent No. 4946881). The resin cage is constructed by coupling a pair of split members formed like rings. The split members have the identical shape and each have a plurality of pocket portions and a plurality of coupling portions alternately arranged in a circumferential direction. Each of the pocket portions has a shape resulting from splitting of a pocket in two halves. The coupling portions of each of the split members are coupled to the coupling portions of the other split member. Each of the coupling portions of the split member has an engagement pawl and an engagement groove formed adjacently to each other in the circumferential direction. The engagement pawls on one of the split members are inserted into and engaged with the corresponding engagement grooves in the other split member. Consequently, the coupling portions of the split members are coupled together so as to be inseparable in the axial direction.

However, in the resin cage described in Japanese Patent No. 4946881, the engagement pawl and the engagement groove need to be formed on each of the coupling portions of the split member. Thus, a mold used to mold the cage has a complicated structure. As a result, production costs for the mold is disadvantageously expensive. The engagement pawl has a base portion and a pawl portion. The base portion protrudes in the axial direction. The pawl portion protrudes from a tip portion of the base portion in a radial direction. Molding the engagement pawl having two portions (the base portion and the pawl portion) with different protruding directions needs not only a mold that is detached in the axial direction but also a mold that is detached in the radial direction. Consequently, the mold has a complicated structure.

On the other hand, the resin cage described in Japanese Patent No. 4946881, the coupled split members may be misaligned with each other in the radial direction, for example, due to a variation in molding of the engagement pawls.

SUMMARY OF THE INVENTION

An object of the present invention is to provide a rolling bearing that can be used under a high-speed rotation condition while allowing mold costs needed to manufacture a resin cage to be kept low.

A rolling bearing according to an aspect of the present invention includes an inner ring, an outer ring, a plurality of rolling elements arranged between the inner ring and the outer ring so as to be able to roll, and a resin cage that holds the rolling elements. The resin cage includes a pair of split members shaped like a ring split in two halves in an axial direction. Each of the split members has a plurality of pocket portions in each of which a half pocket surface for holding the rolling element is formed and a plurality of coupling portions on each of which a coupling surface that comes into contact with a coupling surface of the other split member is formed and which are coupled to coupling portions of the other split member, the pocket portions and the coupling portions being alternately arranged in a circumferential direction. On a first coupling portion of the coupling portions coupled together, an engagement pawl is formed which protrudes from the coupling surface in the axial direction. On a second coupling portion of the coupling portions coupled together, an engagement groove is formed which is recessed in the axial direction with respect to the coupling surface and into which the engagement pawl is inserted. The engagement pawl has a base portion that extends from the coupling surface in the axial direction and a pawl portion that protrudes from a tip portion of the base portion in a radial direction and engages with the second coupling portion. An insertion hole is formed in the first coupling portion so as to pass through the first coupling portion in the axial direction such that a mold that is used to mold a radial end surface of the base portion on a side from which the pawl portion protrudes is inserted into the insertion hole.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
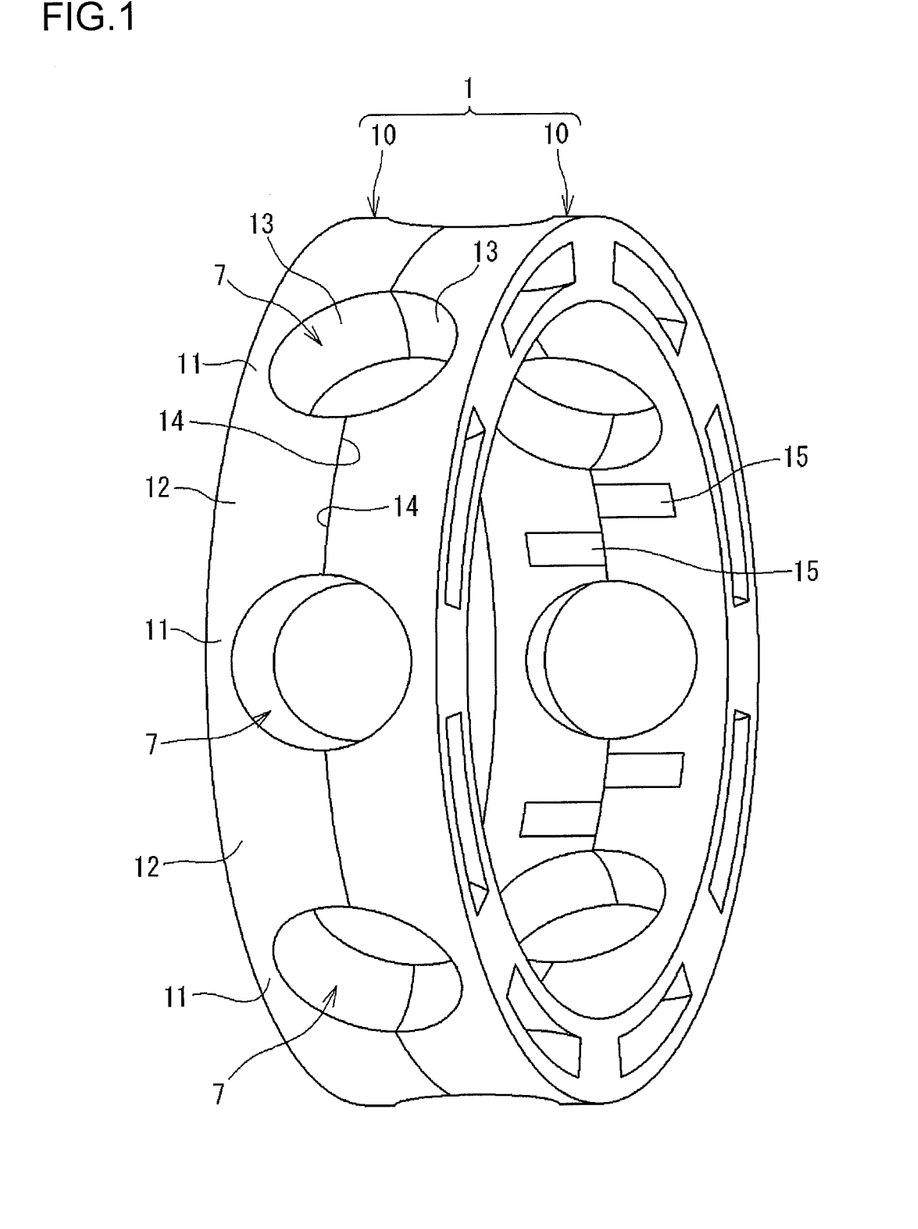
FIG. 1 is a perspective view depicting a resin cage of a rolling bearing according to a first embodiment of the present invention.
Figure 2:
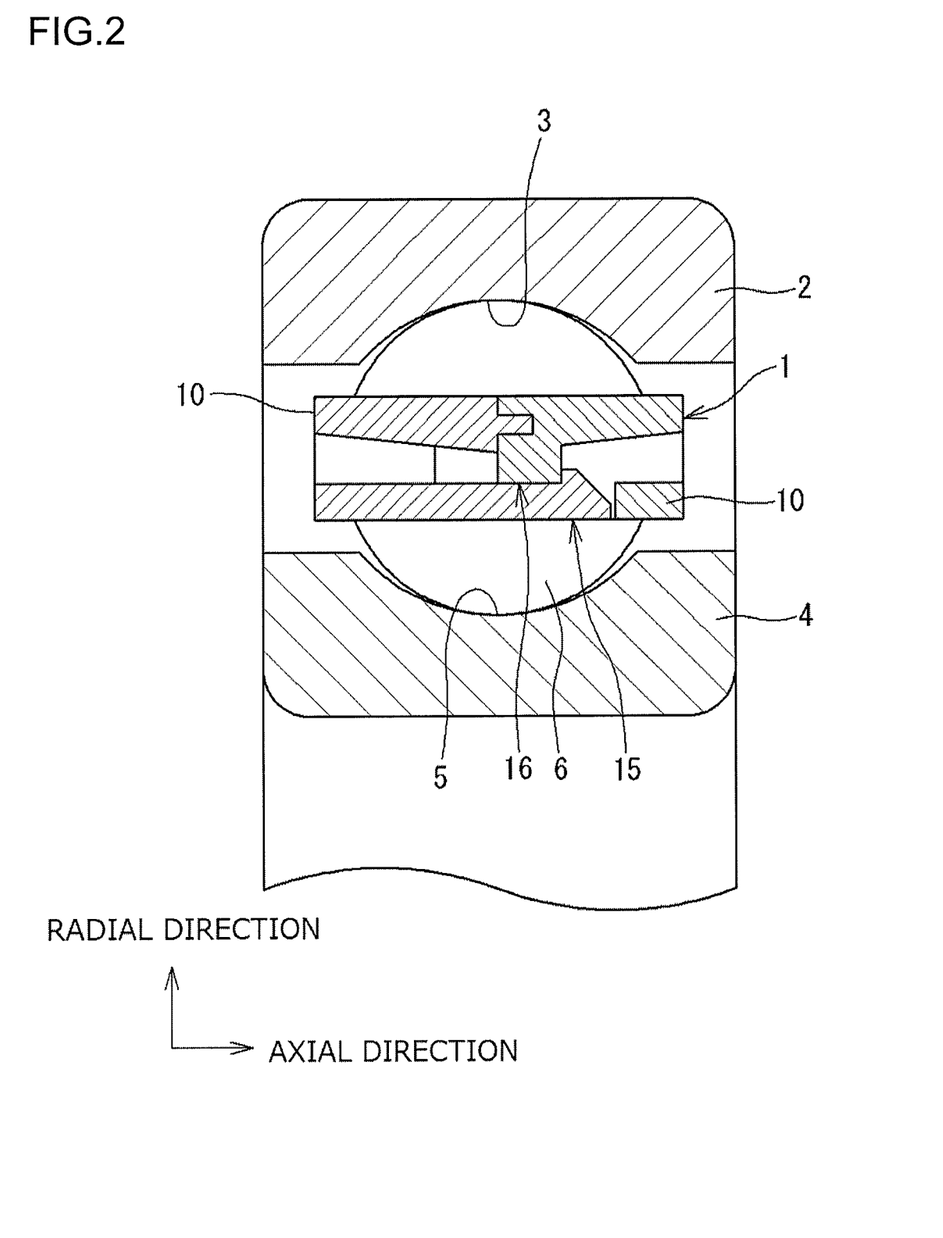
FIG. 2 is a sectional view of the rolling bearing.

Now, embodiments of the present invention will be described with reference to the attached drawings. FIG. 1 is a perspective view depicting a resin cage of a rolling bearing in an embodiment of the present invention. FIG. 2 is a sectional view of the rolling bearing. In FIG. 2, the rolling bearing includes an outer ring 2, an inner ring 4, a plurality of balls (rolling elements) 6, and a cage 1. The outer ring 2 has a raceway surface 3 formed on an inner peripheral surface thereof. The inner ring 4 has a raceway surface 5 formed on an outer peripheral surface thereof. The balls 6 are provided between the raceway surfaces 3 and 5. The cage 1 holds the balls 6 such that the balls 6 can roll.

The cage 1 has a two-piece structure in which the cage 1 is split in two halves in an axial direction. Specifically, the cage 1 is constructed by combining a pair of split members 10 shaped like a ring. In FIG. 1, the cage 1 has a plurality of pockets 7 formed at regular intervals in a circumferential direction. Each of the pockets 7 has a recessed, partially spherical shape along a surface of a sphere having a slightly larger diameter than each of the balls 6 (see FIG. 2). Each of the balls 6 is housed in the corresponding pocket 7 and rotatably held therein.

The split members 10 are formed of a synthetic resin, particularly preferably a soft resin such as a polyamide resin. When the split members 10 are formed of a soft resin, engagement pawls 15 described below are difficult to break upon being elastically deformed at the time of coupling between the split members 10. Consequently, the split members 10 can be prevented from being damaged.

Figure 3:
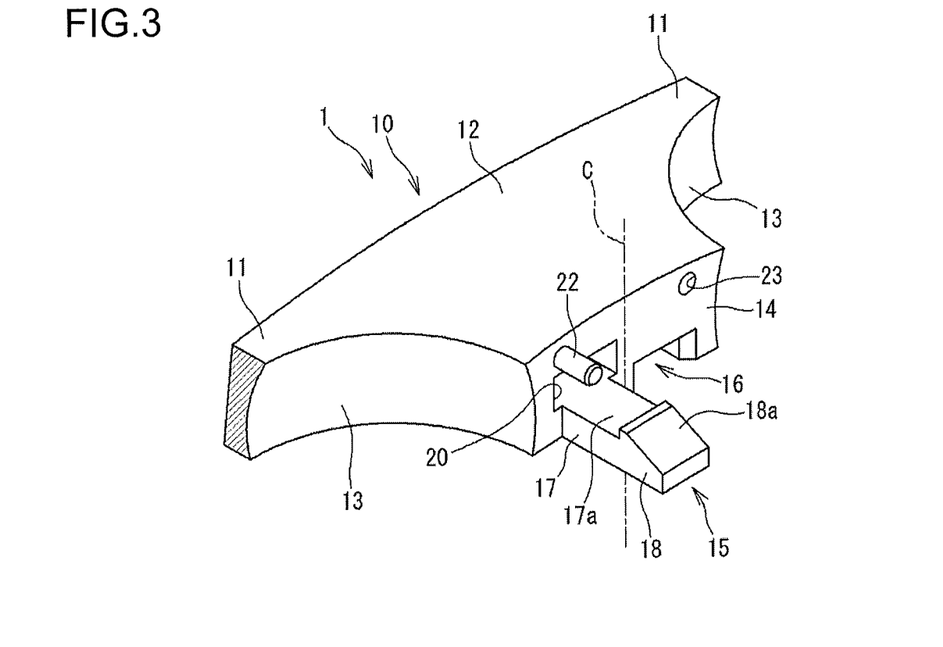
FIG. 3 is a perspective view depicting a part of a split member of the resin cage.

FIG. 3 is a perspective view depicting a part of the split member 10. The cage 1 in the present embodiment includes two split members 10 having an identical shape. The split members 10 each include pocket portions 11 and coupling portions 12 alternately arranged in a circumferential direction. Each of the pocket portions 11 has a half pocket surface 13 for forming the pocket 7 (see FIG. 1). The coupling portions 12 of each of the split members 10 are coupled to the other split member 10 (coupling portions 12). As depicted in FIG. 1, the split member 10 in the present embodiment includes eight pocket portions 11 and eight coupling portions 12. The numbers of the pocket portions 11 and the coupling portions 12 in the present embodiment may be even or odd.

A coupling surface 14 that is a surface perpendicular to an axial direction (a surface extending along a radial direction) is formed on each of the coupling portions 12. The split members 10 are coupled with their coupling surfaces 14 joined together (see FIG. 1).

Figure 4:
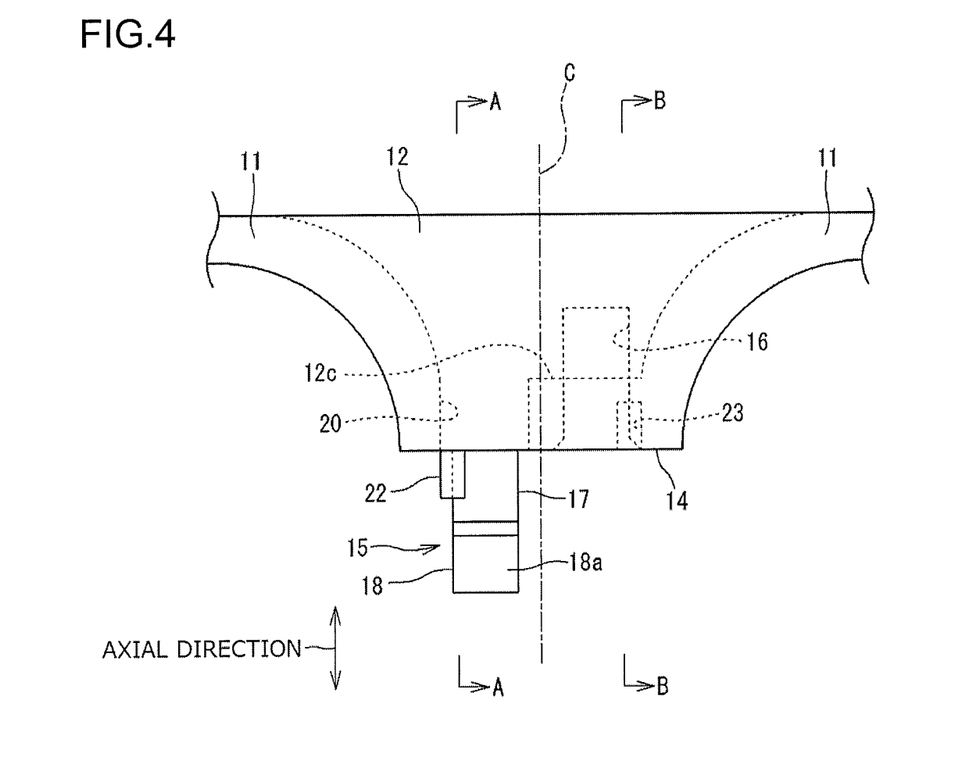
FIG. 4 is a plan view depicting a part of the split member.
Figure 5A:
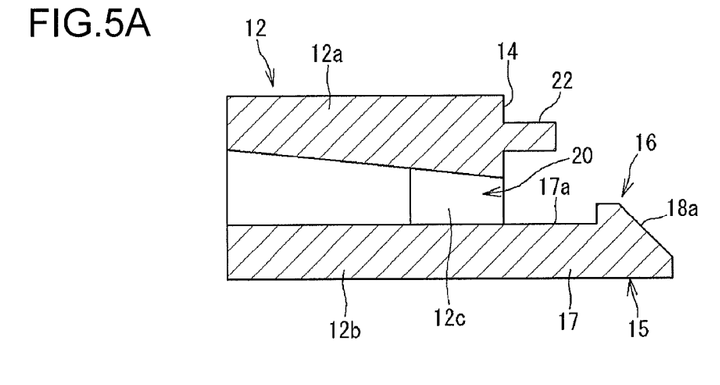
FIG. 5A is a sectional view taken along line A-A in FIG. 4.
Figure 5B:
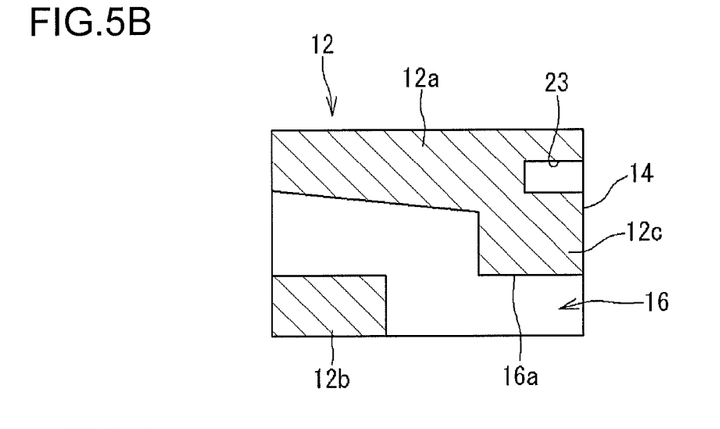
FIG. 5B is a sectional view taken along line B-B in FIG. 4.
Figure 6:
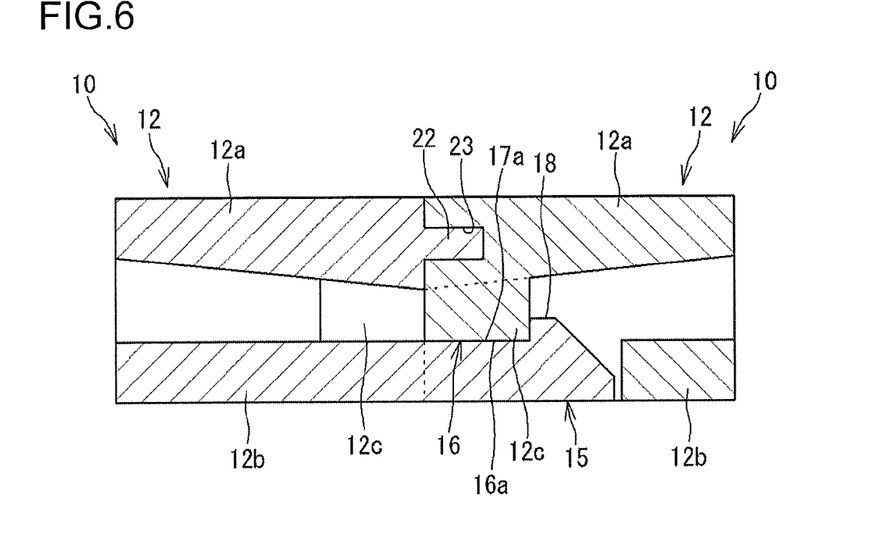
FIG. 6 is a sectional view depicting a coupled state of a pair of split members.

FIG. 4 is a plan view depicting a part of the split member 10. FIG. 5A is a sectional view taken along line A-A in FIG. 4. FIG. 5B is a sectional view taken along line B-B in FIG. 4. FIG. 6 is a sectional view depicting a coupled state of the split members 10. As depicted in FIGS. 3 to 6, each of the coupling portions 12 of the split member 10 has a hollow structure having an outer peripheral wall 12a, an inner peripheral wall 12b, and an inner side wall 12c and enclosed by the walls 12a to 12c. Therefore, the hollow interior of the coupling portion 12 is open at an outer end thereof in the axial direction and is closed by the inner side wall 12c at an inner end of the hollow interior in the axial direction.

The engagement pawl 15 and the engagement groove 16 are formed on each of the coupling portions 12 of the split member 10. The engagement pawl 15 protrudes from the coupling surface 14 in the axial direction. The engagement groove 16 is recessed in the axial direction with respect to the coupling surface 14. The engagement pawl 15 and the engagement groove 16 are formed at symmetric positions with respect to a center C of the coupling surface 14 in the circumferential direction (see FIG. 3 and FIG. 4). The engagement pawl 15 has a base portion 17 and a pawl portion 18. The base portion 17 extends from the coupling surface 14 along the axial direction. The pawl portion 18 protrudes outward from a tip portion of the base portion 17 in the radial direction. The base portion 17 is formed to have a rectangular sectional shape. The pawl portion 18 has an inclined radially outer end surface 18a so as to have a tapered shape. The engagement pawl 15 has a substantially constant circumferential width all along the axial direction.

The engagement groove 16 has a circumferential width slightly larger than a circumferential width of the engagement pawl 15. The engagement groove 16 penetrates the inner side wall 12c of the coupling portion 12 in the axial direction. The engagement groove 16 is open in the inner peripheral wall 12b of the coupling portion 12. When the coupling surfaces 14 of the two split members 10 with the identical shape are placed so as to face each other, the engagement pawls 15 of the coupling surfaces 14 of one of the split members 10 are arranged to face the engagement grooves 16 in the other split member 10. When the coupling surfaces 14 of the split members 10 are joined together, the engagement pawls 15 of one of the split members 10 are inserted into the corresponding engagement grooves 16 in the other split member 10. At this time, the pawl portion 18 of each of the engagement pawls 15 of one of the split members 10 comes into abutting contact with a groove bottom surface 16a of the corresponding engagement groove 16 in the other split member 10. Thus, the base portion 17 is elastically deformed inward in the radial direction. The pawl portion 18 passes along the groove bottom surface 16a of the engagement groove 16 to elastically recover the base portion 17 outward in the radial direction. Then, each of the pawl portions 18 of one of the split members 10 comes into engagement with the inner side wall 12c of the corresponding coupling portion 12 of the other split member 10 (see FIG. 6).

As described above, the pawl portion 18 of the engagement pawl 15 on each coupling portion 12 of one of the split members 10 engages with the corresponding coupling portion 12 of the other split member 10. Consequently, the split members 10 are coupled together so as not to separate from each other in the axial direction. A radially outer end surface 17a of the base portion 17 of each engagement pawl 15 on one of the split members 10 is in abutting contact with the groove bottom surface 16a of the corresponding engagement groove 16 in the other split member 10 to prevent the split members 10 from being misaligned with each other in the radial direction. As described above, in the present embodiment, the fully-encasing resin cage 1 is constructed by coupling two split members 10 together. Thus, the cage 1 can be restrained from being deformed by a centrifugal force. As a result, the resin cage 1 can be used even under a high-speed rotation condition.

As depicted in FIG. 3 and FIG. 4, on each of the coupling portions 12 of the split member 10, a protruding portion 22 is formed which protrudes from the coupling portion 12 in the axial direction, and a recessed portion 23 is also formed which is recessed in the axial direction with respect to the coupling surface 14. The protruding portion 22 is arranged outside the engagement pawl 15 in the radial direction. The recessed portion 23 is arranged outside the engagement groove 16 in the radial direction. The protruding portion 22 and the recessed portion 23 are formed at symmetric positions with respect to the center C of the coupling surface 14 in the circumferential direction.

Figure 8A:
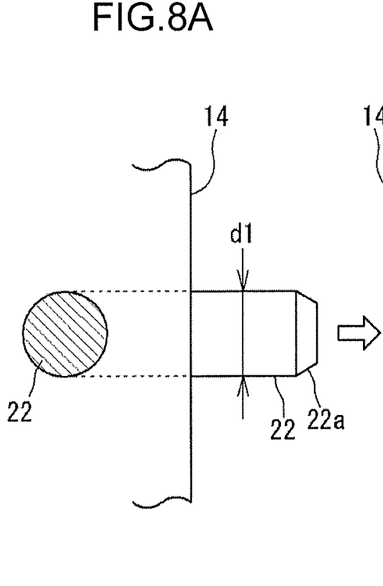
FIGS. 8A and 8B depict the shapes of a protruding portion and a recessed portion.
Figure 8B:
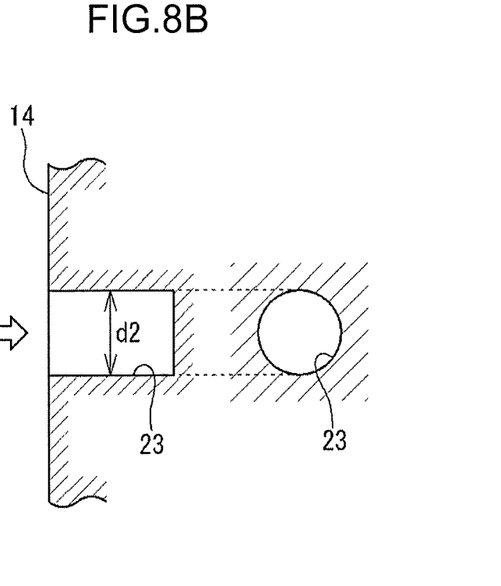

FIGS. 8A and 8B depict the shapes of the protruding portion 22 and the recessed portion 23. FIG. 8A depicts a side surface shape and a cross-sectional shape (sectional contour shape) of the protruding portion 22. FIG. 8B is a longitudinal sectional shape and a cross-sectional shape (sectional contour shape) of the recessed portion 23. The protruding portion 22 is shaped like a cylinder. Therefore, the protruding portion 22 has a substantially uniform circular sectional contour shape in the axial direction. In contrast, the recessed portion 23 is shaped like a cylinder. Therefore, the recessed portion 23 has a substantially uniform circular sectional contour shape all along the axial direction. The sectional contour shape of the recessed portion 23 is formed to be equal in size to or larger than the sectional contour shape of the protruding portion 22. Specifically, a bore diameter d2 of the recessed portion 23 is equal to or larger than an outside diameter d1 of the protruding portion 22. A tapered surface 22a is formed at an outer peripheral edge of a tip portion of the protruding portion 22. With the tapered surface 22a, the protruding portion 22 has a tapered shape.

As described above, the coupling surfaces 14 of the two split members 10 with the identical shape are joined together to engage the engagement pawl 15 of each coupling portion 12 in one of the split members 10 with the corresponding coupling portion 12 of the other split member 10. Thus, coupling of the split members 10 allows the protruding portion 22 of each coupling portion 12 of one of the split members 10 to be fitted into the recessed portion 23 of the corresponding coupling portion 12 of the other split member 10.

When the synthetic-resin split members 10 are molded using a mold, the engagement pawls 15 may be subjected to distortion such as warpage due to a variation in molding. Such distortion makes the coupled split members 10 misaligned with each other in the radial direction. This may reduce assembly accuracy. In the cage 1 in the present embodiment, when the two split members 10 are coupled together, each of the protruding portions 22 is fitted into the corresponding recessed portion 23. Thus, the split members 10 can be prevented from being misaligned with each other, for example, due to distortion of the engagement pawls 15, allowing suitable assembly accuracy to be achieved.

The sectional contour shape of the recessed portion 23 is formed to be equal in size to or larger than the sectional contour shape of the protruding portion 22. As a result, the protruding portion 22 is fitted into the recessed portion 23 by transition fitting or clearance fitting. Consequently, the protruding portion 22 can be easily fitted into the recessed portion 23. The protruding portion 22 is tapered and can thus be more easily fitted into the recessed portion 23.

Figure 7A:
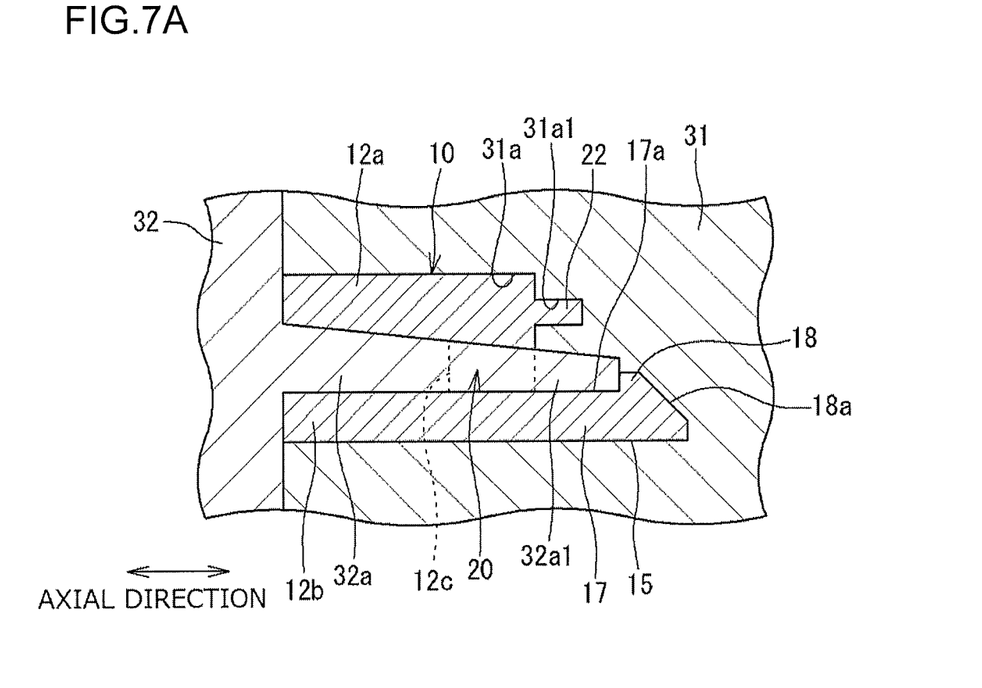
FIG. 7A is a sectional view in which the split member shown in FIG. 5A is manufactured by injection molding using molds.
Figure 7B:
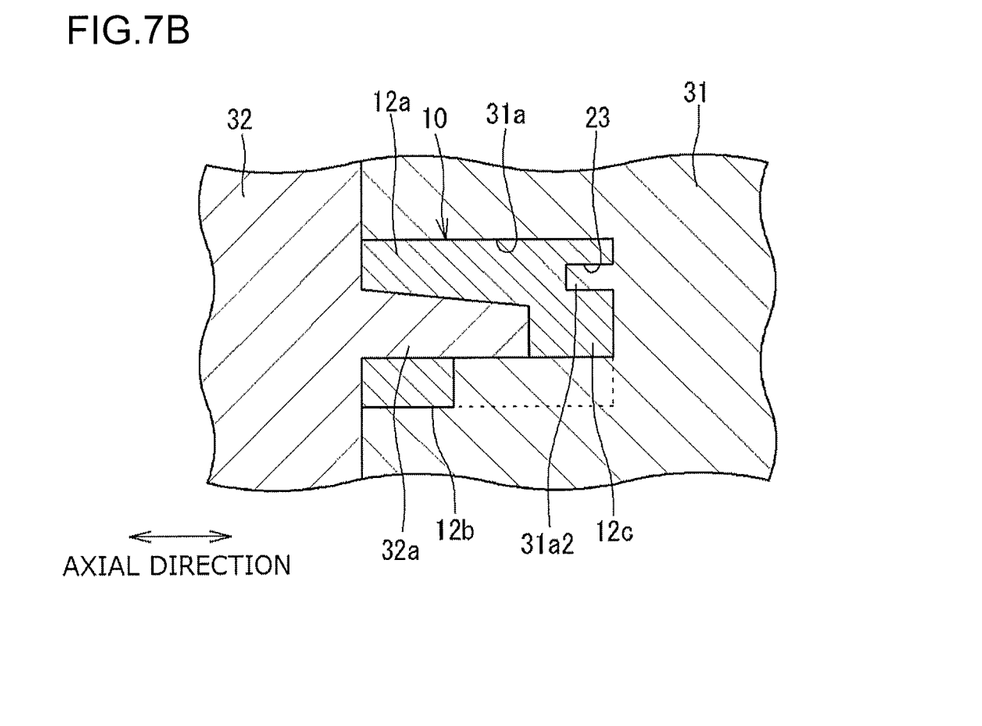
FIG. 7B is a sectional view in which the split member shown in FIG. 5B is manufactured by injection molding using molds.

As depicted in FIGS. 3 to 5, an insertion hole 20 is formed radially outside each of the engagement pawls 15 on the split member 10 so as to penetrate the coupling portions 12 in the axial direction. The insertion hole 20 is used for insertion of a mold for molding of the radially outer end surface 17a of the base portion 17 of the engagement pawl 15. As depicted in FIGS. 7A and 7B, the split member 10 is manufactured, for example, by injection molding using molds 31 and 32. FIG. 7A depicts a mold structure in a section taken along line A-A in FIG. 4. FIG. 7B depicts a mold structure in a section taken along line B-B in FIG. 4.

As depicted in FIGS. 7A and 7B, in the mold 31, a cavity 31a is formed which is used to mold the split member 10. In the mold 32, a core 32a is formed which is used to form the interior of the split member 10. As depicted in FIG. 7A, the core 32a includes pawl molding portions 32a1 each used to form the radially outer end surface 17a of the base portion 17 of the engagement pawl 15. The cavity 31a in the mold 31 has protruding portion molding holes 31a1 and recessed portion molding protrusions 31a2. Each of the protruding portion molding holes 31a1 is used to mold the protruding portion 22. Each of the recessed portion molding protrusions 31a2 is used to mold the recessed portion 23.

The insertion hole 20 is formed outside the engagement pawl 15 in the radial direction. Consequently, the radially outer end surface 17a of the base portion 17 of the engagement pawl 15 can be molded using the pawl molding portions 32a1 inserted into the insertion hole 20. Thus, the molds 31 and 32 can be detached from each other in the axial direction even when the engagement pawl 15 has the pawl portion 18 protruding outward from the tip portion of the base portion 17 of the engagement pawl 15 in the radial direction. In other words, when the insertion hole 20 as described above is not formed, a mold that is detached in the radial direction needs to be provided in addition to a mold that is detached in the axial direction in order to mold the radially outer end surface 17a of the base portion 17 of the engagement pawl 15. In the case of molding the split member 10 with the protruding portion 22, providing a mold that is detached in the radial direction may be difficult. In this regard, in the present embodiment, the insertion hole 20 as described above is formed to enable the split member 10 to be molded using the molds 31 and 32, which are detached from each other in the axial direction. Accordingly, the structures of the molds 31 and 32 can be simplified to reduce mold production costs.

Figure 9:
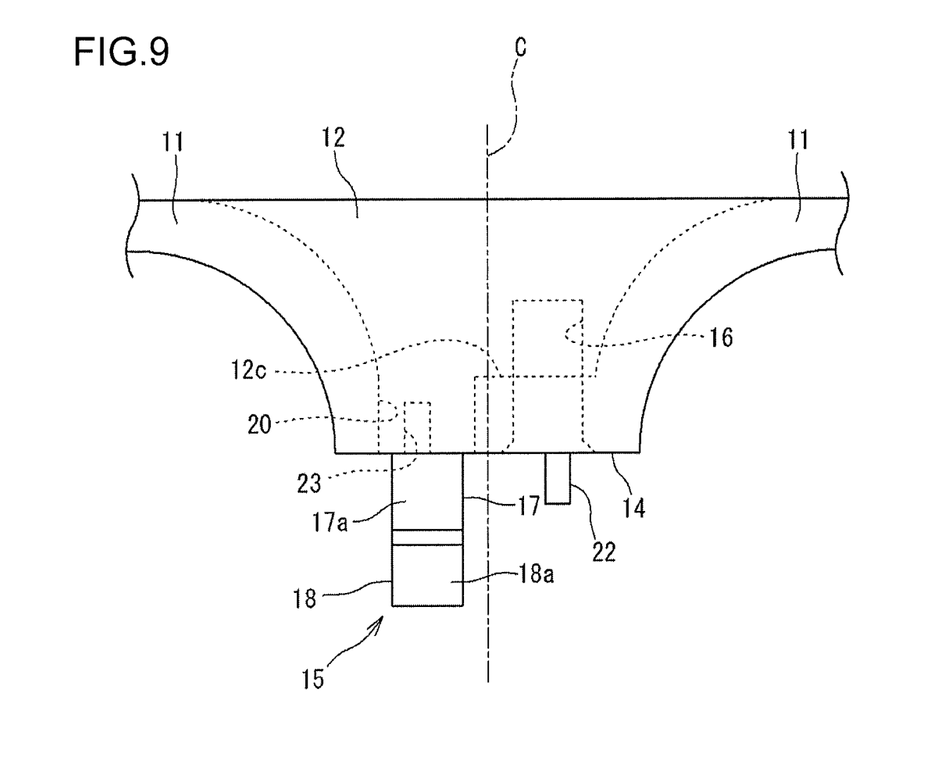
FIG. 9 is a plan view depicting a part of a split member of a resin cage in a second embodiment of the present invention.

FIG. 9 is a plan view depicting a part of a split member of a resin cage in a second embodiment of the present invention. In the split member 10 in the second embodiment, the protruding portions 22 and the recessed portions 23 are arranged differently from the protruding portions 22 and the recessed portions 23 in the first embodiment. That is, the protruding portion 22 in the second embodiment is arranged outside the engagement groove 16 in the radial direction. The recessed portion 23 is arranged outside the engagement pawl 15 in the radial direction. The protruding portion 22 and the recessed portion 23 are formed at symmetric positions with respect to the center C of the coupling surface 14 in the circumferential direction. Therefore, also in the second embodiment, the protruding portion 22 and the recessed portion 23 can be fitted together by joining together the coupling surfaces 14 of the two split members 10 with the identical shape.

Figure 10:
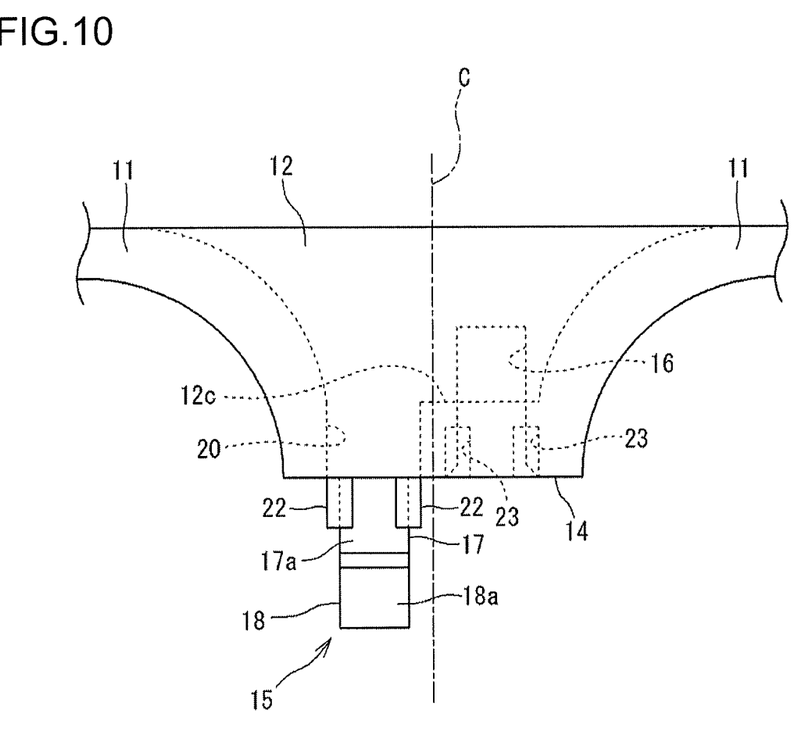
FIG. 10 is a plan view depicting a part of a split member of a resin cage in a third embodiment of the present invention.

FIG. 10 is a plan view depicting a part of a split member of a resin cage in a third embodiment of the present invention. The split member 10 in the third embodiment has a pair of the protruding portions 22 and a pair of the recessed portions 23. Specifically, the two protruding portions 22 are formed outside the engagement pawl 15 in the radial direction. The two recessed portions 23 are formed outside the engagement groove 16 in the radial direction. The two protruding portions 22 and the two recessed portions 23 are formed at symmetric positions with respect to the center C of the coupling surface 14 in the circumferential direction.

Figure 11A:
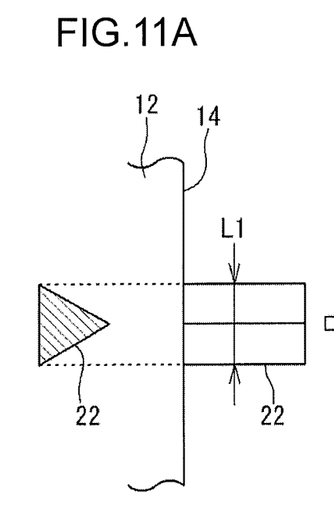
FIGS. 11A and 11B depict the shapes of a protruding portion and a recessed portion of a resin cage in a fourth embodiment of the present invention.
Figure 11B:
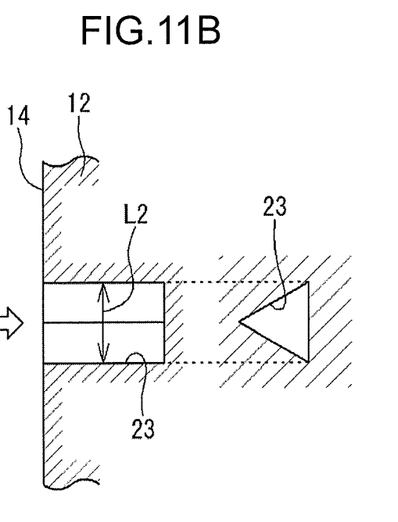

Also in the third embodiment, the split members 10 can be prevented from being misaligned with each other by fitting the protruding portions 22 and the recessed portions 23 together. The two protruding portions 22 and the two recessed portions 23 may be arranged in juxtaposition in the radial direction. Alternatively, one protruding portion 22 and one recessed portion 23 may be formed on each of the two sides of the coupling surface 14 across the center thereof in the circumferential direction FIGS. 11A and 11B depict the shapes of a protruding portion and a recessed portion of a resin cage in a fourth embodiment of the present invention. The protruding portion 22 in the fourth embodiment is shaped like a triangular prism. The recessed portion 23 is shaped like a triangular tube. Therefore, the protruding portion 22 has a sectional contour shape like an equilateral triangle. The recessed portion 23 has a sectional contour shape like an equilateral triangle. The sectional contour shape of the recessed portion 23 is equal in size to or larger than the sectional contour shape of the protruding portion 22. Specifically, the length L2 of one side of a triangle representing the sectional contour shape of the recessed portion 23 is equal to or larger than the length L1 of one side of a triangle representing the sectional contour shape of the protruding portion 22. Therefore, the protruding portion 22 is fitted into the recessed portion 23 by transition fitting or clearance fitting. The remaining part of the configuration of the fourth embodiment is similar to the corresponding parts of configurations of the first to third embodiments, and produces effects similar to the effects of the first to third embodiments.

The disclosed embodiments are illustrative and are not restrictive. The scope of the present invention is indicated by the claims and includes all modifications within the scope of the configurations in the claims and equivalents. For example, the sectional contour shapes of the protruding portion 22 and the recessed portion 23 are not limited to a circle and a triangle. The sectional contour shapes may be polygons with four or more sides and vertices, ellipses, or the like. Any sectional contour shapes may be used as long as the contour shapes are identical or similar to one another. The numbers of the protruding portions 22 and the recessed portions 23 are not limited to the numbers in the above-described embodiments.

The engagement pawl 15 and the engagement groove 16 need not be formed on all of the coupling portions 12. For example, coupling portions 12 each with the engagement pawl 15 and coupling portions 12 each with the engagement groove 16 may be alternately arranged in the circumferential direction. Similarly, the protruding portion 22 and the recessed portion 23 need not be formed on all of the coupling portions 12. Coupling portions 12 each with the protruding portion 22 and coupling portions 12 each with the recessed portion 23 may be alternately arranged in the circumferential direction. However, in these cases, to make the resin cage 1 with the split members 10 with the identical shape, an even number of the coupling portions 12 need to be provided, and in each of the split members 10, the numbers of the engagement pawls 15 and the engagement grooves 16 need to be the same, and the numbers of the protruding portions 22 and the recessed portions 23 need to be the same.

The split members 10 included in the resin cage 1 need not have the identical shape. For example, the engagement pawls 15 may be exclusively formed on the coupling portions 12 of one of the split members 10, whereas the engagement grooves 16 may be exclusively formed on the coupling portions 12 of the other split member 10. Furthermore, the protruding portions 22 may be exclusively formed on the coupling portions 12 of one of the split members 10, whereas the recessed portions 23 may be exclusively formed on the coupling portions 12 of the other split member 10. The protruding portion 22 may be formed on at least one coupling portion 12 of one of the split members 10 and the recessed portion 23 may be formed in at least one coupling portion 12 of the other split member 10.

The pawl portion 18 of the engagement pawl 15 may protrude inward from the tip portion of the base portion 17 in the radial direction. In this case, the coupling portion 12 only need to be provided with the insertion hole 20 to which a mold for molding a radially inner end surface of the base portion 17 is inserted.

The present invention enables the resin cage to be used even under a high-speed rotation condition while allowing mold costs needed to manufacture the resin cage to be kept low.

What is claimed is:

1. A rolling bearing comprising:
an inner ring;
an outer ring;
a plurality of rolling elements arranged between the inner ring and the outer ring so as to be able to roll; and
a resin cage that holds the rolling elements, wherein
the resin cage includes a pair of split members shaped like a ring split in two halves in an axial direction,
each of the split members has a plurality of pocket portions in each of which a half pocket surface for holding the rolling element is formed and a plurality of coupling portions on each of which a coupling surface that comes into contact with a coupling surface of the other split member is formed and which are coupled to coupling portions of the other split member, the pocket portions and the coupling portions being alternately arranged in a circumferential direction;
on a first coupling portion of the coupling portions coupled together, an engagement pawl is formed which protrudes from the coupling surface in the axial direction,
on a second coupling portion of the coupling portions coupled together, an engagement groove is formed which is recessed in the axial direction with respect to the coupling surface and into which the engagement pawl is inserted,
the engagement pawl has a base portion that extends from the coupling surface in the axial direction and a pawl portion that protrudes from a tip portion of the base portion in a radial direction and engages with the second coupling portion, and
the first coupling portion includes an insertion hole that passes through the first coupling portion in the axial direction, a radially outer top portion of the insertion hole being disposed radially outside of a radially outer top portion of the pawl, the insertion hole being dimensioned such that the insertion hole being capable of receiving a mold that is used to mold a radial end surface of the base portion on a side from which the pawl portion protrudes.

2. The rolling bearing according to claim 1, wherein, on at least one of the coupling portions of one of the split members, a protruding portion is formed which protrudes from the coupling surface in the axial direction, and in at least one of the coupling portions of the other split member, a recessed portion is formed which is recessed in the axial direction with respect to the coupling surface and into which the protruding portion is fitted.

3. The rolling bearing according to claim 2, wherein a sectional contour shape of the recessed portion is equal in size to or larger than a sectional contour shape of the protruding portion.

4. The rolling bearing according to claim 3, wherein the protruding portion has a tapered shape.

5. The rolling bearing according to claim 4, wherein, in the coupling surface, the protruding portion and the recessed portion are formed at symmetric positions with respect to a center of the coupling surface in a circumferential direction thereof.

6. The rolling bearing according to claim 5, wherein at least one of the protruding portion and the recessed portion is formed on the coupling portion with at least one of the engagement pawl and the engagement groove formed thereon.

7. The rolling bearing according to claim 4, wherein at least one of the protruding portion and the recessed portion is formed on the coupling portion with at least one of the engagement pawl and the engagement groove formed thereon.

8. The rolling bearing according to claim 3, wherein, in the coupling surface, the protruding portion and the recessed portion are formed at symmetric positions with respect to a center of the coupling surface in a circumferential direction thereof.

9. The rolling bearing according to claim 8, wherein at least one of the protruding portion and the recessed portion is formed on the coupling portion with at least one of the engagement pawl and the engagement groove formed thereon.

10. The rolling bearing according to claim 3, wherein at least one of the protruding portion and the recessed portion is formed on the coupling portion with at least one of the engagement pawl and the engagement groove formed thereon.

11. The rolling bearing according to claim 2, wherein the protruding portion has a tapered shape.

12. The rolling bearing according to claim 11, wherein, in the coupling surface, the protruding portion and the recessed portion are formed at symmetric positions with respect to a center of the coupling surface in a circumferential direction thereof.

13. The rolling bearing according to claim 12, wherein at least one of the protruding portion and the recessed portion is formed on the coupling portion with at least one of the engagement pawl and the engagement groove formed thereon.

14. The rolling bearing according to claim 11, wherein at least one of the protruding portion and the recessed portion is formed on the coupling portion with at least one of the engagement pawl and the engagement groove formed thereon.

15. The rolling bearing according to claim 2, wherein at least one of the protruding portion and the recessed portion is formed on the coupling portion with at least one of the engagement pawl and the engagement groove formed thereon.

16. The rolling bearing according to claim 2, wherein, in the coupling surface, the protruding portion and the recessed portion are formed at symmetric positions with respect to a center of the coupling surface in a circumferential direction thereof.

17. The rolling bearing according to claim 16, wherein at least one of the protruding portion and the recessed portion is formed on the coupling portion with at least one of the engagement pawl and the engagement groove formed thereon.

18. A method for manufacturing the rolling bearing according to claim 1, comprising: a step of molding the split member using a pair of molds, the pair of molds being detachable from each other in the axial direction.

* * * * *